United States Patent [19]
Ito

[11] Patent Number: 5,107,157
[45] Date of Patent: Apr. 21, 1992

[54] LINEAR GUIDE APPARATUS

[75] Inventor: Kouji Ito, Kyoto, Japan

[73] Assignee: Omron Corporation, Kyoto, Japan

[21] Appl. No.: 601,381

[22] Filed: Oct. 23, 1990

[30] Foreign Application Priority Data

Oct. 25, 1989 [JP] Japan .................................. 1-277815

[51] Int. Cl.$^5$ ............................................ H02K 41/02
[52] U.S. Cl. ........................................ 310/12; 310/13;
318/135; 318/38
[58] Field of Search ................. 310/12, 13, 15, 17,
310/83; 318/135, 38

[56] References Cited

U.S. PATENT DOCUMENTS

| | | | |
|---|---|---|---|
| 4,594,520 | 6/1986 | Miwa et al. | 318/135 |
| 4,661,730 | 4/1987 | Maruyama et al. | 318/135 |
| 4,742,255 | 5/1988 | Nakagawa et al. | 310/12 |
| 4,864,170 | 9/1989 | Eguchi | 310/12 |
| 4,879,482 | 11/1989 | Murofushi | 310/12 |
| 4,918,264 | 4/1990 | Yamamoto et al. | 200/5 R |

*Primary Examiner*—Steven L. Stephan
*Assistant Examiner*—Matthew Nguyen

*Attorney, Agent, or Firm*—Dickstein, Shapiro & Morin

[57] ABSTRACT

A linear guide apparatus comprises a fixed body; a movable body movable on the fixed body in a predetermined direction; a retainer disposed between the fixed and movable bodies, for rotatably supporting rolling bodies brought into contact with the fixed and movable bodies; a first rack provided on the fixed body in the predetermined direction; a second rack provided on the movable body in the predetermined direction; a third rack provided on the retainer in the predetermined direction; a first pinion in mesh with the first and third racks, respectively; and a second pinion in mesh with the second rack. The first and second pinions are coupled integrally and coaxially with respect to each other and disposed rotatably and slidably in the predetermined direction. Further, a pitch diameter of the second pinion is three times larger than that of the first pinion. Therefore, the relative positional relationship the fixed body, the movable body and the retainer can be securely maintained, and thus the movable body can be precisely moved relative to the fixed body via the retainer in the predetermined direction.

4 Claims, 5 Drawing Sheets

LINEAR GUIDE APPARATUS

BACKGROUND OF THE INVENTION

1. Field of the Invention

The present invention relates to a linear guide apparatus, and more specifically to a linear guide apparatus including a fixed body, a movable body movable in a predetermined direction on the fixed body, and a retainer for rotatably supporting rolling bodies disposed between and in contact with the fixed body and the movable body. The linear guide apparatus can be used with a flat linear pulse motor, for instance.

2. Description of the Prior Art

FIG. 8 shows an example of prior-art linear guide apparatus used with a linear pulse motor, in which a retainer 63 for supporting rolling bodies such as balls or rollers is disposed between a fixed body 61 and a movable body 62. In the case of a linear pulse motor, a stator formed with magnetic pole teeth is fixed to the fixed body 61, and other magnetic pole teeth are formed in the movable body 62 so as to be opposed to the magnetic pole teeth of the stator, so that the movable body 62 can be moved in the direction that the magnetic pole teeth are arranged, on the basis of the magnetic field generated at the stator. The movement direction of the movable body 62 relative to the fixed body 61 is restricted because the balls (rolling bodies) 64 supported by the retainer 63 are fitted into and guided along V-shaped grooves 61a and 62a formed in the fixed body 61 and the movable body 62, respectively. When the movable body 62 moves in the arrow direction A, the balls 64 in contact with the movable body 62 rotate in the arrow direction B, so that the retainer 63 also moves relative to the fixed body 61 in the arrow direction A by the rotational movement of balls 64.

In the prior-art linear guide apparatus as described above, however, since slippage easily occurs between the movable body 62 and the rolling bodies 64 and between the rolling bodies 64 and the fixed body 61, an error is inevitably produced in the relative positional relationship among the fixed body 61, the retainer 63 and the movable body 62 when the movable body 62 starts to move or is braked, so that it is difficult to move the movable member 62 precisely. In addition, since the V-shaped grooves 61a and 62a are open at both the end thereof (i.e. no stopper members are provided), there exists a problem in that the rolling bodies 64 fall away from the ends of their respective V-shaped grooves 61a and 62a due to accumulated error and therefore the apparatus may be damaged.

SUMMARY OF THE INVENTION

The object of the present invention is to provide a linear guide apparatus which can strictly retain the relative positional relationship among the fixed body, the movable body and the retainer.

A linear guide apparatus according to the present invention comprise a fixed body; a movable body movable on the fixed body in a predetermined direction; a retainer disposed between the fixed body and the movable body, for rotatably supporting rolling bodies brought into contact with the fixed body and the movable body; a first rack provided on the fixed body in the predetermined direction; a second rack provided on the movable body in the predetermined direction; a third rack provided on the retainer in the predetermined direction; a first pinion in mesh with the first and third racks, respectively; and a second pinion in mesh with the second rack; the first pinion and the second pinion being coupled integrally and coaxially with respect to each other and disposed rotatably and slidably in the predetermined direction, and a pitch diameter of the second pinion being determined to be three times larger than that of the first pinion.

According to the present invention, the relative positional relationship among the fixed body, the movable body and the retainer can be securely maintained by engagements among the first, second and third racks fixed to these bodies, respectively and the first and second pinions coupled integrally with each other. Further, since the pitch diameters of the first and second pinions are determined as described above, it is possible to match the respective ratios of the movable body and the retainer to the fixed body in relative movement distance with ideal values obtained when the rolling bodies will not slip, thus allowing the movable body to be moved accurately without slip.

Preferably, the linear guide apparatus comprises rotative angle restricting means for restricting rotation of the second pinion within an angular range corresponding to a movement range of the movable body. The rotative angle restricting means comprises the second pinion formed with a cutout opening through a predetermined angle and a stopper fixed to the fixed body at a predetermined position within the angular range of the cutout of the second pinion. Owing to the restricting means, there exists such an advantage that the movement range of the movable body relative to the fixed body can be securely restricted within a predetermined range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is an exploded view showing a flat linear pulse motor;

FIG. 2 is a plan view showing the flat linear pulse motor, in which an armature is removed;

FIG. 3 is a cross-sectional view of the same shown in FIG. 1;

DETAILED DESCRIPTION OF THE PREFERRED EMBODIMENTS

An embodiment of the present invention will be described hereinbelow, which is applied to a flat linear pulse motor.

Figure 1:
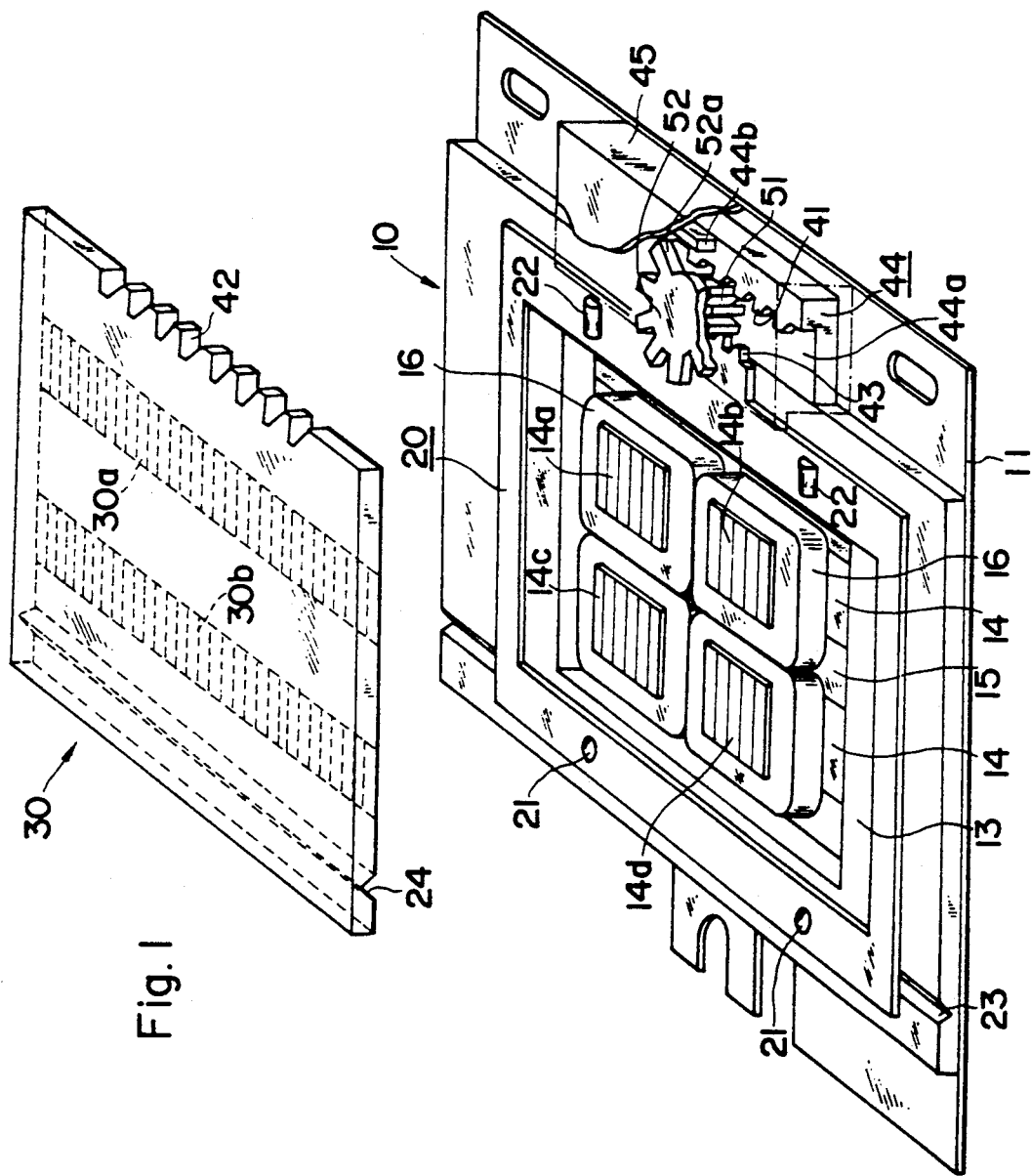
FIGS. 1 to 3 show an embodiment of the present invention.
Figure 2:
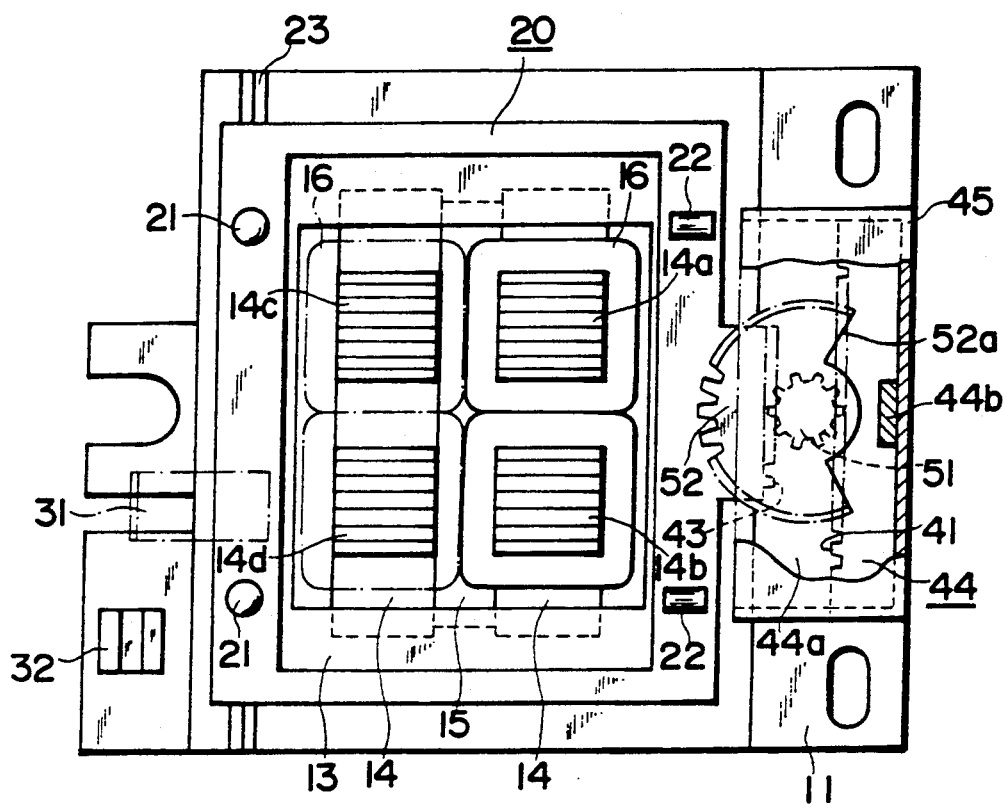
Figure 3:
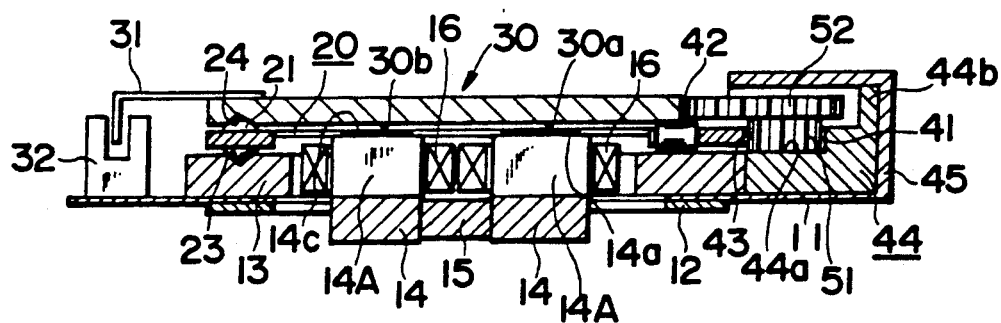

FIG. 1 is an exploded view showing the flat linear pulse motor; FIG. 2 is a plan view showing the same, in which an armature is removed; and FIG. 3 is a cross-sectional view showing the same.

With reference to these drawings, the flat linear pulse motor comprises a stator (a fixed body) 10, an armature (a movable body) 30 and a retainer 20.

The stator 10 is provided with a base 11 at the center of which a square opening is formed. A printed circuit board 12 is attached to the lower surface of the base 11. Another square opening is formed at the center of the board 12. Various electrical parts are mounted on the board 12. Further, a reinforcing plate 13 is attached to the upper surface of the base 11. This reinforcing plate 13 is also formed with a square opening at the center thereof.

Two yorks 14 made of a magnetic material or substance and a permanent magnet 15 are located in the central square openings of the base 11, the board 12 and the reinforcing plate 13. The permanent magnet 15 is sandwiched between a pair of the right and left yorks 14, and the yorks 14 and the magnet 15 are bonded to the lower surface of the reinforcing plate 13 at both the ends thereof. Each york 14 is formed with two projecting portions 14A. On the upper surface of each of these projecting portions 14A, magnetic pole teeth 14a, 14b, 14c or 14d are formed.

The pole teeth 14a to 14d are formed into such a shape that convex (ridge) portions and concave (trough) portions are arranged alternately, being made of a magnetic material. Since a magnetic pole (S or N) can be formed on tops of these convex portions owing to the presence of the permanent magnet 15, they are referred to as magnetic pole teeth. The magnetic pole teeth 14a and 14c are formed with the same pitch and in phase with each other. The same is true of the magnetic pole teeth 14b and 14d. However, the magnetic pole teeth 14a and 14b are formed with the same pitch but ½ pitch out of phase with respect to each other.

A coil 16 is wound around each of the projections 14A of the york 14.

The armature 30 is made of a plate-shaped magnetic material, and formed with two-paralleled arranged magnetic pole teeth 30a and 30b on the lower surface thereof. Each of the magnet pole teeth 30a and 30b is formed with convex (ridge) portions and concave (trough) portions arranged alternately. The pitch of these magnet pole teeth 30a and 30b is the same as that of the magnetic pole teeth 14a to 14d. The magnetic pole teeth 30a is ½ pitch out of phase with respect to the magnetic pole teeth 30b.

The retainer 20 is formed with a square opening at the center thereof. Two round support holes are formed on the left side of the retainer 20 to rotatably support balls 21 therein, and two square support holes are formed on the right side of the retainer 20 to retatably support rollers 22 therein.

Being disposed between the stator 10 and the armature 30, the retainer 20 supports the armature 30 on the stator 10 so that the armature 30 can travel in the direction that the magnetic pole teeth 30a and 30b are arranged.

Two V-shaped grooves 23 and 24 are formed on the left side upper surface of the reinforcing plate 13 and the left side lower surface of the armature 30, respectively in the travel direction of the armature 30. Part of each ball 21 of the retainer 20 is received in each of these grooves 23 and 24. Since the balls 21 rotate in and along these V-shaped grooves 23 and 24, the armature 30 and the retainer 20 are guided therealong during travelling.

The rollers 20 are disposed in contact with the right side upper surface of the reinforcing plate 13 and the right side lower surface of the armature 30, respectively. The magnetic pole teeth 30a of the armature 30 are arranged so as to oppose the magnetic pole teeth 14a and 14b of the stator 10 with a predetermined gap therebetween. Similarly, the magnetic pole teeth 30b of the armature 30 are arranged so as to oppose the magnetic pole teeth 14c and 14d of the stator 10 with a predetermined gap therebetween.

A biasing magnetic flux generated by the permanent magnet 15 generates a magnetic attractive force between the magnetic pole teeth 14a to 14d of the stator 10 and the magnetic pole teeth 30a and 30b of the armature 30 to keep the armature 30 at a position where the armature 30 comes to a standstill at the preceding travel operation end. Under these conditions, each coil 16 is energized sequentially in the order of the magnetic pole teeth 14a, 14c, 14b and 14d in the direction that the attractive force generated at the magnetic pole teeth 14a, 14b, 14c or 14d can be increased, so that the armature 30 is shifted ¼ pitch by ¼ pitch of the magnetic pole teeth in the predetermined travelling direction. When the order that the coils 16 are energized is reversed, the armature 30 is shifted in the opposite direction.

A home position of the armature 30 is detected by a home position sensor. As shown in FIGS. 2 and 3, the home position sensor is composed of a sensor piece 31 fixed to the armature 30 and a sensing unit 32 fixed to the base 11 to optically or magnetically detect the sensor piece 31.

A block 44 is fixed at the center on the right side upper surface of the base 11. This block 44 is formed with a low flat surface 44a which is roughly flush with the upper surface of the reinforcing plate 13, and a first rack 41 is formed on the right side of the flat surface 44a. The first rack 41 and the flat surface 44a both extend in the travelling direction of the armature 30, and the teeth of the rack 41 are formed facing the retainer 20.

A second rack 42 is formed on the right side of the armature 30.

Further, a third rack 43 is formed at the middle portion of the right side of the retainer 20 so as to project rightward and extend in the travel direction of the retainer 20.

A first pinion 51 and a second pinion 52 are formed integrally and coaxially with respect to each other. These pinions 51 and 52 may be formed separately to be joined integrally to each other. There two pinions 51 and 52 are disposed slidably and rotatably on the flat (sliding) surface 44a of the block 44. These pinions 51 and 52 have no axle, respectively and are simply placed on the flat surface 44a.

The first pinion 51 is in mesh with the first rack 41 of the stator 10 on the right side of the first pinion 51, and with the third rack 43 of the retainer 20 on the left side thereof. Further, the second pinion 52 is in mesh with the second rack 42 of the armature 30.

The second pinion 52 is formed with a cutout (denoted by 52a) through an appropriate angle on the right side half thereof. A stopper 44b extending upward is fixed or integrally formed to the block 44 at such a position as to be located within the cutout 52a.

Further, the block 44, the pinions 51 and 52 and so on are covered with a cover 45 fixed to the base 11.

Figure 4:
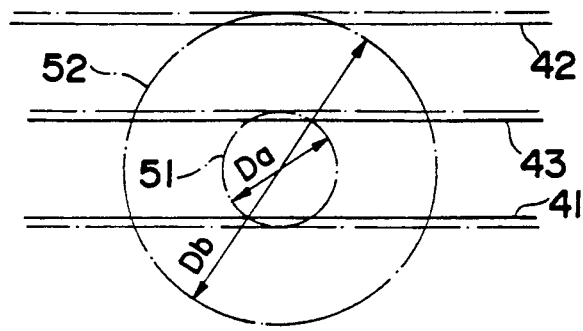
FIG. 4 is a view for assistance in explaining engagements between the racks and the pinions.

The ratio of the first pinion 51 to the second pinion 52 in pitch diameter is so designed as to become 1:3. The reason is as follows:

As shown in FIG. 4, the pitch diameter of the first pinion 51 is denoted by Da; and the pitch diameter of the second pinion 52 is denoted by Db. The relative movement distance of the common center point of the two pinions 51 and 52 is assumed to be LO, and the relative movement distances of the two racks 43 and 42 are assumed to be LR and LS, respectively when the pinions 51 and 52 rotate by an angle θ (radian). Thereupon, the relationship among the rotative angle of the pinions 51 and 52 and relative movement distances of the racks 42 and 43 can be expressed as follows:

$$LO = Da \cdot \theta/2$$

$$LR = = 2 LO$$

$$LS = (Db \cdot \theta/2) + LO$$

Here, since $$Db = 3 Da.$$

$$Db \cdot \theta/2 = 3 LO$$

can be obtained. Therefore, $$LS = 4 LO = 2 LR$$

This indicates that it is possible to always realize a ratio of 1:2 in the relative movement distance of the retainer 20 and the armature 30 to the stator 10, in an ideal condition that the balls 21 and the rollers 22 will not slip relative to the stator 10 and the armature 30.

As described above, the first pinion 51 is geared with the rack 41 of the stator 10 and the rack 43 of the retainer 20; the second pinion 52 is geared with the rack 42 of the armature 30; and the first and second pinions 51 and 52 are coupled integrally and coaxially with each other. Therefore, the relative positional relationship among the stator 10, the retainer 20 and the armature 30 can be securely maintained by the engagements among the racks 41 to 43 and the pinions 51 and 52.

Figure 5:
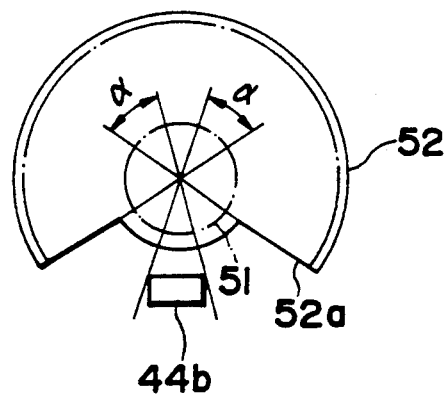
FIG. 5 is a view for assistance in explaining the pinions and a cutout thereof.

In this embodiment, as shown in FIG. 5, the second pinion 52 is formed with the cutout 52a, and further the stopper 44b is disposed so as to be located within this cutout 52a. Therefore, the pinions 51 and 52 rotate only within an angular range 2α (radian) in which the stopper 44b is brought into contact with both the side edges of the cutout 52a. In other words, it is possible to securely restrict the movement range of the armature 30 within a range of Db·α. In this embodiment, however, it is also possible to adapt a second pinion 52 formed with no such cutout 52a as shown.

Figure 6:
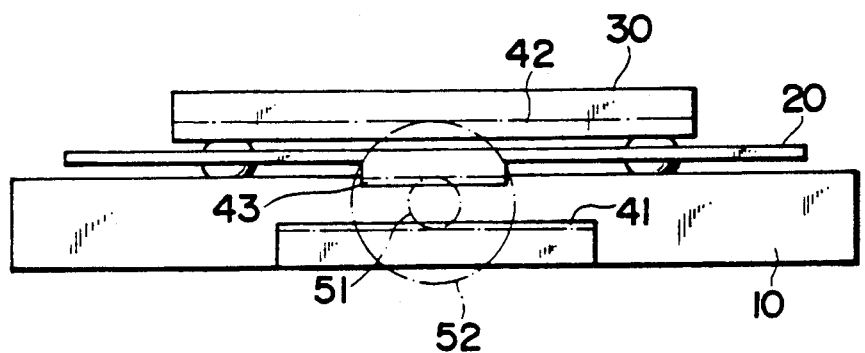
FIG. 6 is a side view showing another embodiment of the present invention.

FIG. 6 is a side view showing another embodiment of the present invention, in which the surfaces of the first pinion 51 and the second pinion 52 are disposed vertically so that these pinions 51 and 52 rotate in a plane perpendicular to the stator 10 and armature 30.

Figure 7:
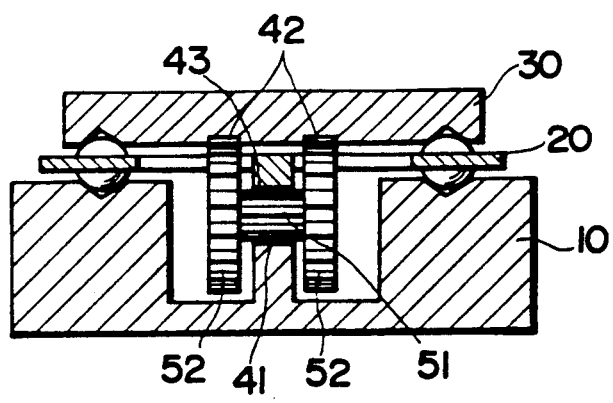
FIG. 7 is a cross-sectional view showing further another embodiment of the present invention.
Figure 8:
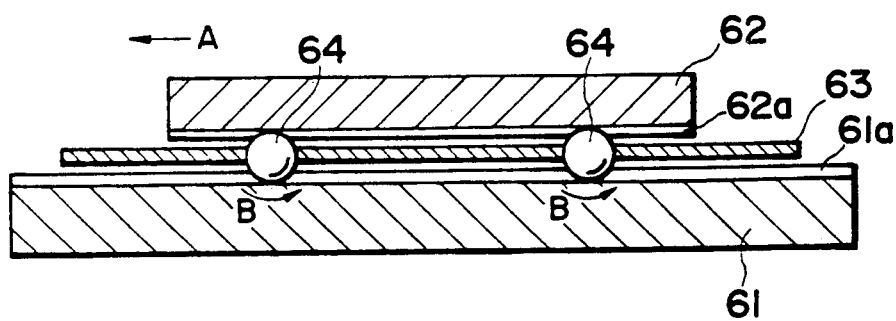
FIG. 8 is a cross-sectional view showing a prior-art linear guide apparatus.

FIG. 7 is a cross-sectional view showing a further embodiment of the present invention. In this embodiment, two second pinions 52 are disposed on both the sides of the first pinion 51, two racks 42 provided on the armature 30 are in mesh with these pinions 52; a recessed portion is formed in the stator 10, and the second pinions 52 and the first rack 41 are located within this recessed portion.

As many apparently widely different embodiments of the present invention can be made without departing from the spirit and scope thereof, it is to be understood that the invention is not limited to the specific embodiments thereof except as defined in the appended claims.

I claim:

1. A linear guide apparatus comprising:
   a fixed body;
   a movable body movable on said fixed body in a predetermined direction;
   a retainer disposed between said fixed body and said movable body, for rotatably supporting rolling bodies that are brought into contact with said fixed body and said movable body;
   a first rack provided on said fixed body in the predetermined direction and having teeth facing said retainer;
   a second rack provided on said movable body in the predetermined direction and having teeth opposing those of said first rack;
   a third rack provided on said retainer in the predetermined direction and having teeth opposing those of said first rack;
   a first pinion in mesh with the teeth of said first and third racks, respectively; and
   a second pinion in mesh with the teeth of said second rack;
   said first pinion and said second pinion being coupled integrally and coaxially with respect to each other and disposed rotatably and slidably in the predetermined direction, and a pitch diameter of said second pinion being three times larger than a pitch diameter of said first pinion.

2. The apparatus of claim 1, further comprising rotative angle restricting means for restricting rotation of said second pinion within an angular range corresponding to a movement range of said movable body.

3. The apparatus of claim 2, wherein said rotative angle restricting means comprises:
   said second pinion formed with a cutout opening through a predetermined angle; and
   a stopper fixed to said fixed body at a predetermined position within the angular range of the cutout of said second pinion.

4. The apparatus of claim 1, wherein each of said fixed body and said movable body is formed with a V-shaped groove for receiving part of said rolling bodies in the predetermined direction.

* * * * *